United States Patent [19]

Frey et al.

[11] Patent Number: 5,631,986
[45] Date of Patent: May 20, 1997

[54] OPTICAL FIBER FERRULE

[75] Inventors: Robert G. Frey; Timothy D. Fletcher, both of White Bear Lake, Minn.

[73] Assignee: Minnesota Mining and Manufacturing Co., St. Paul, Minn.

[21] Appl. No.: 235,169

[22] Filed: Apr. 29, 1994

[51] Int. Cl.⁶ ........................................ G02B 6/36
[52] U.S. Cl. ........................... 385/78; 385/60; 385/72; 385/85
[58] Field of Search ................... 385/78, 84, 85, 385/60, 61, 72

[56] References Cited

U.S. PATENT DOCUMENTS

| | | | |
|---|---|---|---|
| Re. 34,005 | 7/1992 | Levinson et al. | 385/80 |
| 4,135,781 | 1/1979 | Archer | 385/85 |
| 4,456,713 | 6/1984 | French et al. | 523/455 |
| 4,648,688 | 3/1987 | Ashman et al. | 385/61 |
| 4,690,911 | 9/1987 | Nakada | 501/105 |
| 4,695,126 | 9/1987 | Cook | 350/96.21 |
| 4,729,619 | 3/1988 | Blomgren | 385/70 |
| 4,737,011 | 4/1988 | Iri et al. | 350/96.2 |
| 4,763,980 | 8/1988 | Gerber et al. | 385/85 |
| 4,790,622 | 12/1988 | Levinson et al. | 350/96.2 |
| 4,815,809 | 3/1989 | Saostak | 350/96.2 |
| 4,856,865 | 8/1989 | Lee | 350/96.21 |
| 4,962,990 | 10/1990 | Matsuzawa et al. | 350/96.2 |
| 4,978,193 | 12/1990 | Tomita | 350/96.21 |
| 4,984,865 | 1/1991 | Lee et al. | 350/96.21 |
| 5,017,532 | 5/1991 | Sonnenberg et al. | 501/103 |
| 5,052,774 | 10/1991 | Bulman et al. | 385/86 |
| 5,087,594 | 2/1992 | Kato et al. | 501/97 |
| 5,101,463 | 3/1992 | Cubukciyan et al. | 385/72 |
| 5,134,677 | 7/1992 | Leung et al. | 385/84 |
| 5,212,752 | 5/1993 | Stephenson et al. | 385/78 |
| 5,222,169 | 6/1993 | Chang et al. | 385/87 |
| 5,245,684 | 9/1993 | Terao et al. | 385/85 |
| 5,248,463 | 9/1993 | Obitsu et al. | 264/63 |
| 5,274,729 | 12/1993 | King et al. | 385/134 |
| 5,325,452 | 6/1994 | Stein et al. | 385/85 |
| 5,337,390 | 8/1994 | Henson et al. | 385/84 |
| 5,351,327 | 9/1994 | Lurie et al. | 385/85 |
| 5,412,747 | 5/1995 | Matsuoka et al. | 385/85 |
| 5,432,880 | 7/1995 | Diner | 385/85 |

FOREIGN PATENT DOCUMENTS

| | | |
|---|---|---|
| 0235192 | 7/1986 | European Pat. Off. . |
| 0225781A2 | 6/1987 | European Pat. Off. . |
| 0351827A2 | 7/1989 | European Pat. Off. . |
| 0590586A1 | 9/1993 | European Pat. Off. . |
| 63-205618 | 8/1988 | Japan . |
| 5-134141 | 5/1993 | Japan . |

OTHER PUBLICATIONS

"Alumina vs. Zirconia for Optical Connectors," Anderson et al., *Connection Technology*, Oct. 1991, pp. 24–25.

"Connector suppliers set sights on rapid installation; Technology Guide: Fiberoptic Connectors," Resnick, *Laser Focus World*, Aug. 1990, pp. 149–156.

"Connector geometry raises fiberoptic–link performance; Technology Guide: Fiberoptic Connectors," Denny, *Laser Focus World*, Aug. 1992, pp. 123–130.

"Fiber Optic Trends: Ceramic Capillary Connectors," Tamulevich, *Photonics Spectra*, Oct. 1984, pp. 65–70.

*Primary Examiner*—Rodney B. Bovernick
*Assistant Examiner*—Robert E. Wise
*Attorney, Agent, or Firm*—Gary L. Griswold; Walter N. Kirn; H. Sanders Gwin, Jr.

[57] ABSTRACT

A ceramic optical fiber ferrule is constructed from $CaTiO_3$ (calcium titanate) or $CeO_2$—$ZrO_2$ (ceria-zirconia). The ferrule is PC-radiused and thus includes a first, convex end having a predetermined radius of curvature, a second end, and an axial bore which joins the first and second ends. An optical fiber can be fixedly positioned within the bore and a terminal end of the optical fiber can be created by standard polishing or grinding techniques which is coplanar with the first, convex end of the ferrule.

29 Claims, 2 Drawing Sheets

OPTICAL FIBER FERRULE

BACKGROUND OF THE INVENTION

The present invention relates to ferrules for optical fiber connectors and, more particularly, to $CaTiO_3$ or $CeO_2$–$ZrO_2$ ferrules having a physical contact (PC) finish.

The use of optical fibers for high speed communication and data transmission via optical signals has become well established. To this end, optical fiber connectors have been developed to allow optical fibers to be coupled to and uncoupled from other optical fibers or optical devices (i.e., sources or receivers of optical signals). Such connectors must provide precise alignment and minimum spacing at connected fiber ends to assure high levels of light transmission. Furthermore, the connectors should be easily and reliably connected, disconnected and reconnected. Examples of such connectors are shown, for example, in U.S. Pat. Nos. 5,101,463; 5,134,677; 5,052,774; 5,212,752; and 5,222,169. As used herein, the term "connector" means an apparatus which allows connection, disconnection and reconnection of two optical fibers or of an optical fiber and an optical device, as opposed to a "splice," which normally connotes a permanent connection between the fibers.

A critical component of optical fiber connectors is the ferrule. Ferrules are used to align, hold, and protect the fragile ends of optical fibers at the point of connection or termination and therefore have precise dimensional tolerances. When the termini of optical fibers are inserted and fixed (usually glued) within ferrules, the probability of damaging them is significantly reduced, especially during the grinding and/or polishing processes required to produce smooth end-faces on fiber termini. When connectors are installed in the field, the lapping and polishing processes are done by hand and are therefore difficult to control. Ferrules are preferably made from materials having a low coefficient of thermal expansion, high elastic modulus, and high hardness. Ceramics are the material of choice because they exhibit the above properties and can be polished to high smoothness and flatness.

A particularly advantageous type of connector is one which utilizes a ferrule having a physical contact (PC) finish. A PC-finished ferrule has a radiused (i.e., convex) contact surface. The contact surface of the ferrule is the surface at which the terminal end of the optical fiber is located and which is brought into contact with the contact surface of another ferrule in order to make an optical connection between the two termini of the connected fibers. The contact surface can also be brought into contact with a device which generates an optical signal, such as a laser or photodiode, thereby allowing the optical fiber which terminates in the ferrule to transmit the signal. Similarly, the contact surface can be abutted against a device which receives an optical signal carried by the ferrule-terminated optical fiber, such as a photocell. Connectors which employ PC-finished ferrules generally provide means (e.g., a spring) for axially biasing the contact surface of the ferrule away from the connector so that, when coupled to, e.g., another connector, the contact surfaces of both ferrules will be urged into contact with one another. When this occurs, the radiused contact surfaces preferably flatten somewhat against one another, thereby improving the liklihood of intimate contact between the fiber termini by spreading the area of Hertzian contact between the contact surfaces of the two ferrules. For example, a pair of typical, PC-finished zirconia ferrules having an outside diameter of 2.5 mm will have a flat contact patch of about 200 μm when pressed against one another by conventional PC connectors.

Historically, alumina was the first ceramic used to make ferrules. With the advent of the PC-finished ferrule, however, the industry recognized the advantages of using zirconia to make ferrules. Zirconia, while somewhat softer than alumina, has a lower elastic modulus and therefore deforms more easily under pressure. The lower modulus thus increases the area of the Hertzian contact between the radiused ferrules to enhance the likelihood that a good optical connection results. When zirconia is used to make molded/sintered articles such as optical fiber ferrules, it must contain small amounts (about 2 to 5 mole %) of a stabilizer to stabilize the tetragonal phase and prevent fracture that would otherwise be caused by shrinkage accompanying the transition to the more thermodynamically stable monoclinic phase during high temperature sintering. Typical stabilizers include yttria ($Y_2O_3$), calcium oxide (CaO), and magnesium oxide (MgO). The most common stabilizer is yttria ($Y_2O_3$).

Both alumina and yttria-zirconia are much harder than the typical glass fiber termini joined by the connector. This hardness mis-match causes the fiber to polish faster than the ceramic ferrule. Somewhat misleading is the notion that a hard ferrule acts as a "polish stop", i.e., polishing of the fiber end face ceases when it is "polished down" to where it is coplanar with the ferrule surface thus avoiding any fiber "under-cut." It is true that the rate of fiber polishing is greatly reduced when coplanarity is achieved. However, the softer glass fiber often continues to be worn away at a greater rate than the surrounding ceramic ferrule. This produces "undercut" of the fiber end face (i.e., the fiber end is polished below the plane of the ferrule contact surface). Such undercutting is illustrated in FIG. 1 wherein a typical alumina or yttria-zirconia ferrule 1 is shown. The end-face 2 of optical fiber 3 has been polished down below the contact surface 4 of ferrule 1. This results in an air-gap 5 between end-face 2 of optical fiber 3 and contact surface 4 of ferrule 1. Such an air-gap is typically several tenths of micron in depth.

Since the fiber-ferrule endfaces are no longer coplanar, more force must be applied to the ferrules to produce the deformation required to bring the fiber termini into contact. If insufficient force is applied such that the fiber termini are not brought in contact with one another, the resultant air-gap between the fiber termini causes back reflections and other types of signal loss phenomena to occur in the transmitted optical signal. Furthermore, the undercut can trap and retain polishing debris, which later is dislodged and interferes with inter-ferrule/fiber contact resulting in increased spacing between fibers when two ferrules are mated in an optical connector.

One approach to reducing undercut (while beneficially speeding up the polishing process) would be to reduce the hardness mis-match between the optical fiber and ferrule by using a softer ceramic to make the ferrule. However, there has been great reluctance to give up the perceived robustness of zirconia or alumina ceramics, which artisans of ordinary skill believe is required if ferrules are to withstand the rigors encountered in the use environment. Of particular concern in this regard is the repeated coupling/decoupling movements to which a ferrule is subjected when used in an optical fiber connector (as opposed to, e.g., a splicing device in which a ferrule is subjected to a coupling movement only once during the lifetime of the ferrule). In use, connector ferrules are repeatedly inserted and removed from metal or ceramic sleeves known as couplers as they are engaged/disengaged with other ferrules or optical devices. The clearance between the ferrule and coupler is small such that frictional forces are generated between the ferrule and coupler each time the ferrule is inserted and removed from the coupler. Such frictional forces cause wear which, in turn, produces a build-up of debris (wear particles) within the connector. Although a certain amount of wear is inevitable, excessive wear can cause retention of wear particles in the connector assembly which degrades performance by increasing both signal loss and reflectance. It is frequently impractical to clean both sides of a connector every time it is removed from a coupler. It should therefore be possible for a connector that has been properly cleaned to be repeatedly reconnected without being recleaned.

Accordingly, a need exists in the art for improved, softer ceramics which will reduce the hardness mis-match between optical fibers and ferrules without causing premature or high signal loss over time due to excess wear and debris build-up from repeated coupling/decoupling movements at the point of optical connection.

SUMMARY OF THE INVENTION

One aspect of the present invention provides an optical fiber ferrule comprising a ceramic body of $CaTiO_3$ or $CeO_2$—$ZrO_2$. The ceramic body comprises:
a) a first, convex end having a predetermined radius of curvature;
b) a second end; and
c) a bore through the body which joins the first and second ends.

A second aspect of the present invention provides an optical fiber connector, comprising:
a) a $CaTiO_3$ or $CeO_2$—$ZrO_2$ ferrule as described above;
b) a housing having a first end and a second end, the ferrule being contained within the housing such that the first end of the ferrule is extendable from the first end of the housing;
c) an optical fiber extending through the second end of the housing and of the ferrule and being fixedly positioned within the bore of the ferrule, the optical fiber having a terminal end proximate the first end of the ferrule.

A third aspect of the present invention provides a method of terminating an optical fiber in a ferrule, comprising the steps of:
a) providing a ferrule comprising a ceramic body of $CaTiO_3$ or $CeO_2$—$ZrO_2$, said body having a first, convex end with a predetermined radius of curvature, a second end, and a bore which joins the first and second ends;
b) inserting an optical fiber through the second end of the ferrule and into the bore so that a terminal portion of the optical fiber protrudes from the first end of the ferrule; and
c) cleaving the terminal portion such that a grindable or polishable part of the optical fiber remains extending from the first end of the ferrule.

The ferrules of the present invention are softer than standard yttria-zirconia or alumina ferrules. As a result, there is less of a hardness mis-match between the ferrule and the termini of glass optical fibers. While yttria-zirconia and alumina have Vickers penetration hardnesses of approximately 11–13 GPa and 15–18 GPa, respectively, $CaTiO_3$ (calcium titanate) has a Vickers penetration hardness of about 7–9 GPa and $CeO_2$—$ZrO_2$ (ceria-zirconia) has a Vickers penetration hardness of about 8–10 GPa. A glass optical fiber typically has a Vickers penetration hardness of approximately 4–6 GPa. By reducing the hardness mis-match between the ferrule and the fiber termini, the amount of undercut produced in polishing the fiber end-face/ferrule contact surface is substantially reduced or eliminated. As a result, air gaps between abutting fiber termini will also be substantially reduced or eliminated, thereby preventing signal losses. In addition, there is a strong economic incentive to make ferrules from softer ceramics. Both grinding time and tool wear are reduced during the grinding and polishing processes used to produce the precise dimensional tolerances specified for ferrules.

Surprisingly, although the calcium titanate ferrules of the present invention are softer than conventional yttria-zirconia or alumina ferrules, the calcium titanate ferrules have been found to exhibit less of an increase in signal loss over time than yttria-zirconia ferrules. As demonstrated in Example 4 below, when calcium titanate and yttria-zirconia ferrules were repeatedly inserted and removed from a coupler, the calcium titanate ferrules exhibited no increase in signal loss with repeated insertions while the yttria-zirconia ferrules showed measurable signal loss with repeated insertions. Thus, the calcium titanate ferrules of the present invention possess all of the aforementioned advantages associated with a softer ferrule (i.e., easier polishing and no undercutting of the optical fiber terminal end) without the disadvantage of high and/or premature signal loss.

DETAILED DESCRIPTION OF THE PREFERRED EMBODIMENTS

Figure 1:
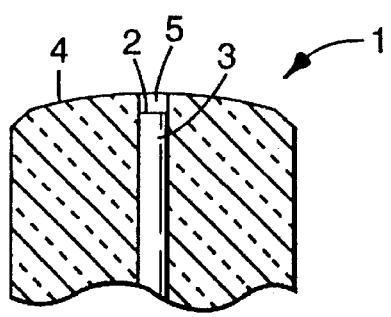
FIG. 1 is a fragmentary cross-sectional view of a Prior Art ferrule made from standard yttria-zirconia or alumina, and illustrates the optical fiber undercutting which can occur in such ferrules.
Figure 2:
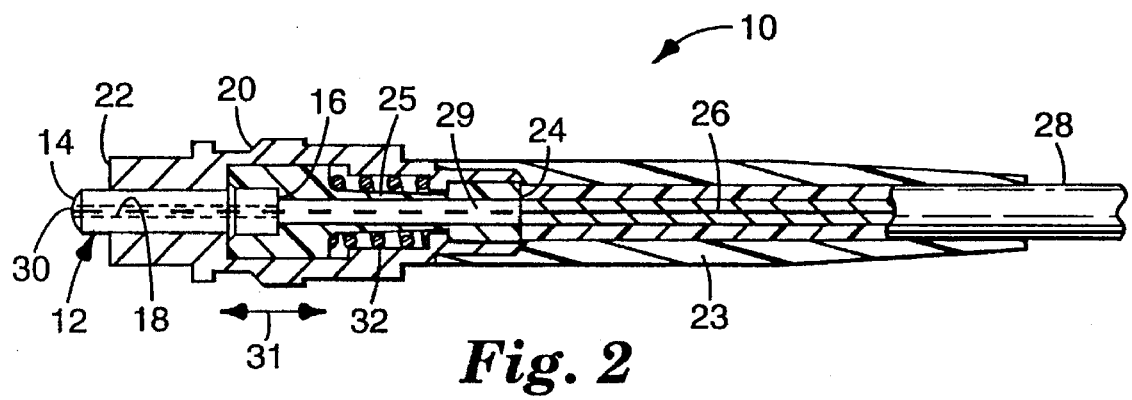
FIG. 2 is a cross-sectional view of a standard optical fiber connector having therein a PC-finished ferrule of the present invention.

Referring to FIG. 2, an optical fiber connector 10 is shown along with a ferrule 12 of the present invention. Connector 10 may be any type of optical fiber connector such as, e.g., an ST®, SC, FC, D4, or FDDI, connector. See, e.g., U.S. Pat. Nos. 5,274,729, 5,222,169, 5,212,752, 5,134,677, 5,101, 463, and 5,052,774, which describe such connectors. As will be explained in more detail below, ferrule 12 comprises a ceramic body of $CaTiO_3$ (calcium titanate) or $CeO_2$—$ZrO_2$ (ceria-zirconia). The ceramic body of ferrule 12 includes a first, convex end 14 with a predetermined radius of curvature, a second end 16, and a bore 18 through the body which joins first and second ends 14 and 16. Connector 10 includes a housing 20 having a first end 22 and a second end 24. Ferrule 12 is contained within housing 20 and is generally positioned such that first end 14 of the ferrule is extendable from first end 22 of housing 20. Connector 10 also conventionally includes strain-relief boot 23 and collar 25. Boot 23 is compressively secured around protective jacket 28 of optical fiber 26 while a portion of buffer coating 29, from which protective jacket 28 has been stripped, is contained within collar 25.

Optical fiber 26 extends through second end 24 of housing 20, through second end 16 of ferrule 12, and is fixedly positioned, e.g., with an adhesive, within bore 18 of ferrule 12. As is conventional, protective jacket 28 and buffer coating 29 have been stripped a predetermined distance from the end of optical fiber 26 prior to inserting the optical fiber into bore 18 of ferrule 12. Terminal end 30 of optical fiber 26 is proximate first end 14 of ferrule 12. More preferably, terminal end 30 is coplanar with first end 14 of ferrule 12.

As with conventional connectors, ferrule 12 is slidably contained within housing 20 in a direction which is parallel to a line extending through first and second ends 22, 24, as indicated by the arrow in FIG. 2. Means, such as spring 32, can be provided for biasing ferrule 12 away from second end 24 of housing 20. As shown, second end 16 of ferrule 12 is contained within collar 25 which is, in turn, biased by spring 32. In this manner, first end 14 of ferrule 12 can be urged against a desired external surface (e.g., the fiber terminus end of another ferrule or the source or receiver of an optical signal) to make an optical connection.

Calcium titanate ceramic powders suitable for extrusion or injection molding are commercially available from a number of sources. For example, calcium titanate powder can be obtained from Tam Ceramics, Inc., Niagara Falls, N.Y.; or Ferro Corp., Transelco Div., Penn Yan, N.Y. Calcium titanate powders typically consist of a mixture of particles of different sizes, generally ranging in size from 0.3–10 μm.

As desired, the calcium titanate ferrules may optionally contain additional materials. For example, the construction may optionally include $TiO_2$ (titanium dioxide) at a weight percentage ranging from about 0–20. Titanium Dioxide is available from Tam Ceramics, Inc., Kronos, Inc., Houston, Tex.; Whittaker, Clark, and Daniels, South Plainfield, N.J.; and Reade Advanced Materials, Providence, R.I. Titanium dioxide has a lower thermal expansion coefficient than calcium titanate ($8-10 \times 10^{-6}/°C$. vs. $10-12 \times 10^{-6}/°C$.) and, therefore, can be used to lower the overall thermal expansion coefficient of the ferrule.

The ferrules of the present invention may alternatively be constructed from ceria-zirconia. The ceria may be present in the ceramic body at a weight percentage ranging from about 12–21 and the zirconia may be present at a weight percentage ranging from about 79–88. An advantage of ceria-zirconia ferrules is their relative toughness as compared with alumina or yttria-zirconia. Ceria-zirconia typiclly has a KIC fracture toughness of about 15–17 $MPa(mm)^{1/2}$ while alumina and yttria-zirconia generally have KIC fracture toughnesses of 3–5 and 8–10 $MPa(mm)^{1/2}$, respectively. The higher toughness of ceria-zirconia ferrules is advantageous because such ferrules are less susceptible to fracture or chipping when dropped or subjected to other high impact stresses in the use environment. Ceria-zirconia ceramic powders are commercially available from, e.g., Tosoh USA, Inc., Atlanta, Ga.; Unitec Ceramics Limited, Stafford, England; and Zirconia Sales (America), Inc., Atlanta, Ga. Ceria-zirconia particles generally range in size from 0.1–5 μm.

Calcium titanate or ceria-zirconia ferrules of the present invention may be produced with conventional binders and additives by any conventional ceramic manufacturing process. In addition to calcium titanate or ceria-zirconia powder, binders which may be used in the ceramic molding feedstock include, e.g., polystyrene, polyethylene, paraffin wax, polypropylene, polyacrylic resin, polyamide, ethylene-vinyl acetate copolymer, and beeswax. As is conventional, plastizers/lubricants may also be added to the feedstock, such as petroleum oil, stearates, stearic acid, oleic acid, waxes, polyethylene glycol, dibutyl phthalate, or paraffin wax. Surfactants, such as menhaden fish oil, phosphate esters, glyceryl trioleate, polymeric fatty esters, polyethylene-imine, sodium polyacrylate, sodium dioctyl sulfosuccinate, ammonium polyacrylate, and ammonium citrate, are also typically included in ceramic molding feedstocks.

The ferrules may be prepared by conventional injection or extrusion forming techniques, e.g., extrusion molding, injection molding, powder compaction, or isostatic pressing. For example, calcium titanate ferrules may be formed in accordance with the techniques disclosed in U.S. Pat. Nos. 4,456,713, 5,087,594, or 5,248,463, the disclosures of which are incorporated herein by reference. Ceria-zirconia ferrules may be prepared by the process disclosed in U.S. Pat. No. 4,690,911, the disclosure of which is incorporated herein by reference. Generally, using conventional injection molding machines and molds, injection pressures can range from about 1,000–10,000 psi, injection speeds can range from about 0.04–4 inches/second, injection nozzle temperatures can range from about 175°–250° F., and mold cavity temperatures can range from about 70°–110° F. In the case of calcium titanate, the injection-molded feedstock would be fired to a temperature ranging from about 1100°–1350° C. at a heating rate ranging from about 0.1°–3° C./minute. A ceria-zirconia feedstock would be fired to a temperature ranging from about 1350°–1600° C. at a heating rate ranging from about 0.1°–3° C./minute. As is well known, the above processing parameters are preferably adjusted as necessary to attain near full density of the fired ceramic.

Figure 3:
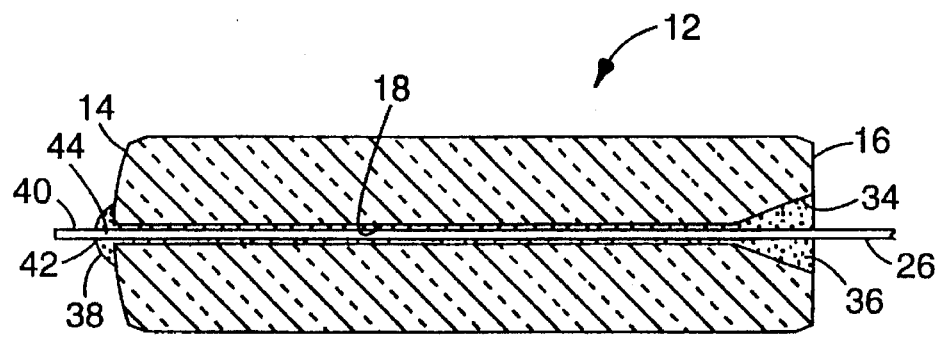
FIG. 3 is a cross-sectional view of a PC-finished ferrule of the present invention having an optical fiber fixedly positioned within the bore thereof.

After the forming process has been completed and the ceramic parts are fired, a ceramic ferrule "blank" is produced. The blank is then ground and/or polished by conventional means to produce the ferrule of the present invention. Such a ferrule is illustrated in FIG. 3 (the optical fiber is subsequently inserted, as will be explained below). As is conventional, such ferrules generally have a cylindrical shape with a length ranging from 5–15 mm and a diameter ranging from 1–4 min. Further, the bore 18 typically has a diameter of uniform size ranging from 0.05–1.0 min. As will be apparent to those skilled in the art, however, the foregoing dimensions are not critical and may be varied as desired to meet the needs of the particular application in which the ferrules of the present invention are to be utilized.

During the grinding and polishing process, first end 14 of ferrule 12 may be radiused to form a convex contact surface. As an alternative, first end 14 may be radiused after an optical fiber has been inserted into the bore 18 thereof. Conventionally, the radius of curvature of first end 14 ranges from about 2–30 mm and, more preferably, from 15–20 mm. However, other radii of curvature may be employed without deviating from the scope of the present invention. The radius of curvature of first end 14 may be provided by any suitable grinding or polishing process, such as profile grinding or multistep grinding on a resilient backing using a hard abrasive material (e.g., diamond).

Subsequent to the manufacture of ferrule 12, an optical fiber will be inserted into bore 18. This can occur immediately after the ferrule has been manufactured or it may occur sometime later, e.g., in the field where an optical fiber is to be connected to an optical or optoelectronic device, or to another optical fiber. In either event, a predetermined length of the protective buffer coatings are first stripped from the terminal end of the optical fiber. As shown in FIG. 3, the optical fiber 26 is then inserted into bore 18 through second end 16 until a portion 40 of the fiber 26 protrudes from first end 14. A lead-in funnel 34 may conveniently be provided at second end 16 to facilitate the insertion operation.

Optical fiber 26 may be fixedly positioned within bore 18 by any conventional means, e.g., with an adhesive or fiber clamp. As illustrated, an adhesive 36 is used to secure optical fiber 26 to those portions of ferrule 12 which define bore 18. Any suitable adhesive may be used, such as a thermoset (e.g., epoxy) or thermoplastic (e.g., hot-melt) adhesive. Suitable epoxies are disclosed in RE 34,005, a reissue of U.S. Pat. No. 4,790,622, while suitable hot-melt adhesives are disclosed in U.S. Pat. No. 4,984,865. Preferably, adhesive 36 is disposed inside of bore 18 and adhesive bead 38 is formed on first end 14 prior to the insertion of optical fiber 26 into ferrule 12. While the adhesive is in a molten or pre-cured state, optical fiber 26 is pushed through bore 18 until a portion 40 protrudes from first end 14 and from bead 38.

Figure 4:
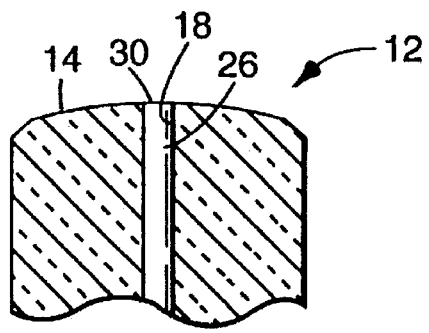
FIG. 4 is a fragmentary cross-sectional view of the ferrule shown in FIG. 2, and illustrates the coplanarity of the optical fiber end-face with the contact surface of the ferrule.

Upon cooling or curing of adhesive 36, adhesive bead 38 solidifies to provide lateral support to the protruding portion 40 of optical fiber 26. As a result of this support, protruding portion 40 of optical fiber 26 can be cleaved then abrasively finished, e.g., grinded or polished. As is conventional, the protruding portion 40 is cleaved at the tip 42 of adhesive bead 38 so that only a grindable or polishable part 44 of optical fiber 26, surrounded by adhesive bead 38, remains extending from first end 14 of ferrule 12. Part 44 and adhesive bead 38 can then be simultaneously ground or polished to form a terminal end-face on optical fiber 26. Grinding or polishing can be performed by any suitable means, e.g., in accordance with the techniques disclosed in U.S. Pat. No. 4,815,809 or Japanese Kokai Patent Application No. SHO 63[1988]-205618. Preferably, grinding or polishing continues until, as illustrated in FIG. 4, a terminal end 30 is produced which is substantially coplanar with first end 14 of ferrule 12. By the term "coplanar," it is meant that the radius of curvature of terminal end 30 is substantially the same as that of first end 14 of ferrule 12, and that terminal end 30 is substantially flush with first end 14. Since the curvature of first end 14 and terminal end 30 is very slight, the two surfaces effectively form a plane in the immediate vicinity of their intersection.

As compared with standard yttria-zirconia or alumina ferrules, the calcium titanate or ceria-zirconia ferrules of the present invention make such coplanarity more readily acheivable because of the closer hardness match between the ferrule and the glass optical fiber. That is, while yttria-zirconia and alumina have Vickers penetration hardnesses of approximately 11–13 GPa and 15–18 GPa, respectively, calcium titanate has a Vickers penetration hardness of about 7–9 GPa and ceria-zirconia has a Vickers penetration hardness of about 8–10 GPa. A glass optical fiber typically has a Vickers penetration hardness of approximately 4–6 GPa. By reducing the hardness mis-match between the ferrule 12 and the optical fiber 26, the amount of undercut produced while polishing or grinding remaining part 44 of optical fiber 26 and surrounding adhesive bead 38 is substantially reduced or eliminated. As a result, terminal end 30 can easily be made coplanar with first end 14 as shown in FIG. 4. In this manner, when first end 14 of ferrule 12 is brought into optical contact with an optical device or another ferrule, an air gap will not occur between the terminal end 30 and the other optical surface. Thus, the ferrules of the present invention reduce the liklihood of back reflections and other types of signal loss which would otherwise occur at the optical connection if an air gap were present at the optical connection.

Figure 5:
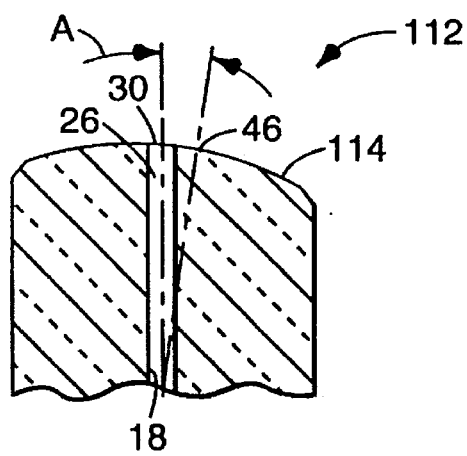
FIG. 5 is a fragmentary cross-sectional view of an alternative embodiment of a ferrule of the present invention, wherein the contact surface is canted to minimize back-reflections.

Referring now to FIG. 5, an alternative embodiment of the present invention will be described. Ferrule 112 is similar in all respects to ferrule 12 except that ferrule 112 has a first, convex end 114 which is canted at an angle "A" ranging from 0°–10° relative to bore 18. The radius of curvature of first end 114 may still range from 2–30 mm. However, the apex 46 of the convex shape of first end 114 is offset by 0°–10° from bore 18. In addition to the coplanarity of terminal end 30 of optical fiber 26 with first end 114, this configuration helps to further reduce signal-reducing back reflections at the situs of the optical connection between terminal end 30 and an optical device or another optical fiber. This technique is further described in U.S. Pat. No. 4,978,193.

Figure 6:
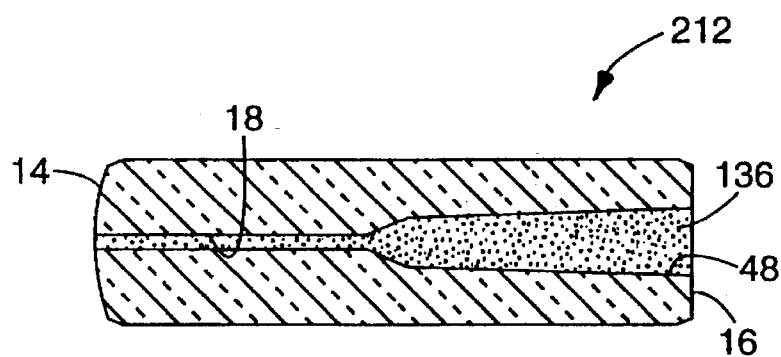
FIG. 6 is a cross-sectional view of a ferrule of the present invention having therein a reservoir containing an adhesive material.

FIG. 6 illustrates another embodiment of the present invention wherein ferrule 212 includes a reservoir 48 fluidly communicating with bore 18. Reservoir 48 is positioned at second end 16 of ferrule 212 and contains therein an adhesive 136. Preferably, adhesive 136 is a hot-melt adhesive. This permits easy field installation of an optical fiber into the ferrule by simply heating the ferrule 212 to melt adhesive 136 and then inserting the terminus of an optical fiber through bore 18 until the fiber protrudes from first end 14. Upon cooling, the protruding portion of the optical fiber can be cleaved and then ground and/or polished to form a terminal end which is coplanar with first end 14.

The invention will now be further described by the following non-limiting examples.

EXAMPLES

Example 1

A number of calcium titanate ferrules were made by injection molding a 95:05 weight percent mixture of calcium titanate:titanium dioxide. "Ticon 65" calcium titanate powder and "Ticon TO-(HG)" titanium dioxide powder, both from Tam Ceramics, Inc, were used. The powder preparation and injection molding processes used to make the ferrule blanks were similar to that disclosed in U.S. Pat. Nos. 5,087,594 and 5,248,463. The ferrules were sintered at 1240° C. for 4 hours. Upon cooling, the ferrules were ground to produce an ST®-type PC-finished ferrule, i.e., a ferrule having a contact end with a 15 mm radius of curvature, a length of 10.5 mm, an outside diameter of 2.499 mm, and a bore diameter of 0.127 mm.

Example 2

The calcium titanate ferrules of Example 1 were used to make ST®-type jumpers by adhesively bonding bare fiber termini into the bore of each ferrule using a hot-melt adhesive. The hot-melt adhesive used is described in U.S. Pat. No. 4,984,865. A control group was also prepared which consisted of a similar number of ST® jumpers made from standard, commercially available ST®-type yttria-zirconia ferrules. The optical fiber used was standard 62.5/125 micrometer multi-mode fiber widely used and commercially available in the industry. Excess fiber extending beyond the radiused end of each of the ferrules was removed by cleaving the fiber near the ferrule surface. Finally, the cleaved fiber tips were polished using the following three (3) step polishing process:

Step 1—Polish with 6 micrometer diamond lapping film for 36 seconds;

Step 2—Polish with 1.5 micrometer diamond lapping film for 42 seconds;

Step 3—Polish with 0.05 micrometer diamond lapping paste for 7 seconds.

Example 3

Each of the calcium titanate and yttria-zirconia jumpers from Example 2 was measured for coplanarity between the optical fiber terminal end and the radiused end of the ferrule. Coplanarity was measured using standard optical interferometry methods such as, e.g., those described in *Polarized Light Microscopy*, McCrone et al., Ann Arbor Science Publishing, Ann Arbor, Mich., 1978. More specifically, optical interferometry was used to measure the amount of undercut of the optical fiber terminal end relative to the surface of the radiused end of each ferrule. The calcium titanate jumpers were essentially co-planar at the fiber-ferrule interface, while the yttria-zirconia jumpers had several tenths of a micrometer under-cutting of the glass fiber terminal end. These results confirm the hypothesis that hard yttria-zirconia ferrules, having a large hardness mismatch between fiber and ferrule, produce measurable fiber undercutting, while softer calcium titanate ferrules, having less hardness mismatch, produce polished fiber/ferrule endfaces that are effectively co-planer.

Example 4

The durability of the calcium titanate and yttria-zirconia jumpers of Example 2 was evaluated in accordance with the Durability Test described in Bellcore Technical Reference TR-NTW-000326, Issue 3, June 1992, Section 4.1.5. The cleaning procedure used is described in Section 5.3.1.

The objective of the Durability Test is to observe both the overall change in performance of the connector with repeated insertions as well as variations in performance of the connector with repeated insertions during the test. To this end, two (2) pairs of calcium titanate jumpers (calcium titanate against calcium titanate) and two (2) mixed pairs of jumpers (yttria-zirconia against calcium titanate) were subjected to the 500 insertion Durability Test. After every 25th insertion, the connector was cleaned in accord with Bellcore Test Method-Section 5.3.1, and upon reinsertion the optical loss of each pair was measured and recorded. Results are shown in Table 1.

This data surprisingly shows that the softer, calcium titanate ferrules did not show any measurable increase in signal loss relative to the harder yttria-zirconia ferrules during insertion testing. Conventional wisdom would predict that the softer calcium titanate ferrules would exhibit more wear during repeated insertions, which in turn would lead to larger insertion losses as the test progressed. However, this was not the case. The calcium titanate ferrule pairs of this invention did not exhibit an increase in insertion loss that exceeded the 0.01 dB sensitivity threshold of the test equipment during the course of the 500 insertion Durability Test. Conversely, the mixed zirconia-calcium titanate pairs showed losses as high as 0.08 dB.

TABLE I

DURABILITY TEST RESULTS

| No. of Insertions | $CaTiO_3$ to $Y_2O_3$ JUMPER PAIRS | | $CaTiO_3$ to $CaTiO_3$ JUMPER PAIRS | |
|---|---|---|---|---|
| | Pair #1 LOSS (dB) | Pair #2 LOSS (dB) | Pair #3 LOSS (dB) | Pair #4 LOSS (dB) |
| 0 | 0 | 0 | 0 | 0 |
| 25 | +.01 | +.01 | 0 | 0 |
| 50 | +.01 | −.02 | 0 | 0 |
| 75 | +.02 | −.02 | 0 | 0 |
| 100 | +.04 | −.05 | 0 | 0 |
| 125 | +.03 | −.02 | 0 | 0 |
| 150 | +.06 | 0 | 0 | 0 |
| 175 | +.08 | +.01 | 0 | 0 |
| 200 | +.07 | +.01 | 0 | 0 |
| 225 | +.07 | −.07 | 0 | 0 |
| 250 | +.06 | −.04 | 0 | 0 |
| 275 | +.01 | 0 | 0 | 0 |
| 300 | 0 | 0 | 0 | 0 |
| 325 | 0 | 0 | 0 | 0 |
| 350 | +.01 | +.03 | 0 | 0 |
| 375 | +.01 | +.04 | 0 | 0 |
| 400 | +.02 | +.06 | 0 | 0 |
| 425 | +.01 | +.07 | 0 | 0 |
| 450 | +.04 | +.07 | 0 | 0 |
| 475 | +.03 | −.02 | 0 | 0 |
| 500 | +.02 | 0 | 0 | 0 |

What is claimed is:

1. An optical fiber ferrule comprising a ceramic body of $CaTiO_3$, said body comprising:
   a) a first, convex end having a predetermined radius of curvature;
   b) a second end; and
   c) a bore through said body which joins said first and second ends.

2. The ferrule of claim 1 wherein said radius of curvature ranges from 2–30 mm.

3. The ferrule of claim 2 wherein said radius of curvature ranges from 15–20 mm.

4. The ferrule of claim 1 wherein said first, convex end is canted at an angle ranging from 0°–10° relative to said bore.

5. The ferrule of claim 1 wherein said ceramic body has a cylindrical shape with a length ranging from 5–15 mm and a diameter ranging from 1–4 mm.

6. The ferrule of claim 1 wherein said bore has a diameter of uniform size ranging from 0.05–1.0 mm.

7. The ferrule of claim 1 wherein said ceramic body further includes a reservoir fluidly communicating with said bore and positioned at said second end of said ceramic body, said reservoir having disposed therein an adhesive.

8. The ferrule of claim 1 wherein an optical fiber is fixedly positioned within said bore.

9. The ferrule of claim 8 wherein said optical fiber is fixed within said bore by an adhesive, said adhesive securing said optical fiber to the portions of said ceramic body which define said bore.

10. The ferrule of claim 8 wherein:
    said optical fiber has a terminal end; and
    said terminal end of said fiber is substantially coplanar with said first, convex end of said ferrule.

11. An optical fiber connector, comprising:
    a) a ferrule comprising a ceramic body of $CaTiO_3$, said body comprising:
       1) a first, convex end with a predetermined radius of curvature,
       2) a second end, and
       3) a bore through said body which joins said first and second ends;
    b) a housing having a first end and a second end, said ferrule being contained within said housing such that said first end of said ferrule is extendible from said first end of said housing; and c) an optical fiber extending through said second end of said housing and through said second end of said ferrule, said optical fiber being fixedly positioned within said bore of said ferrule and having a terminal end proximate said first end of said ferrule.

12. The connector of claim 11 wherein:

said ferrule is slidably contained within said housing in a direction which is parallel to a line extending through said first and second ends of said housing; and said connector includes means for biasing said ferrule away from said second end of said housing such that said first end of said ferrule can be urged against an external surface.

13. The connector of claim 11 wherein said optical fiber is fixed within said bore by means of an adhesive, said adhesive securing said optical fiber to the portions of said ceramic body which define said bore.

14. The connector of claim 11 wherein said terminal end of said fiber is substantially coplanar with said first, convex end of said ferrule.

15. A method of terminating an optical fiber in a ferrule, comprising the steps of:

a) providing a ferrule comprising a ceramic body of $CaTiO_3$, said body having a first, convex end with a predetermined radius of curvature, a second end, and a bore which joins said first and second ends;

b) inserting an optical fiber through said second end of said ferrule and into said bore so that a terminal portion of said optical fiber protrudes from said first end of said ferrule;

c) cleaving said terminal portion such that a grindable or polishable part of said optical fiber remains extending from said first end of said ferrule; and d) grinding or polishing said grindable or polishable part of said optical fiber to form a terminal end which is substantially coplanar with said first end of said ferrule.

16. The method of claim 15 wherein said optical fiber is fixed within said bore by an adhesive, said adhesive securing said optical fiber to the portions of said ceramic body which define said bore.

17. An optical fiber ferrule comprising a ceramic body of $CeO_2$—$ZrO_2$, said body comprising:

a) a first, convex end having a predetermined radius of curvature;

b) a second end; and c) a bore through said body which joins said first and second ends.

18. The ferrule of claim 17, wherein $CeO_2$ is present in said ceramic body at a weight percentage ranging from about 12–21 and $ZrO_2$ is present in said ceramic body at a weight percentage ranging from about 79–88.

19. The ferrule of claim 17, wherein said ceramic body further comprises a reservoir fluidly communicating with said bore and positioned at said second end of said ceramic body, said reservoir having disposed therein an adhesive.

20. The ferrule of claim 17, wherein an optical fiber is fixedly positioned within said bore by an adhesive, said adhesive securing the optical fiber to the portions of said ceramic body which define said bore.

21. The ferrule of claim 20 wherein:

said optical fiber has a terminal end; and said terminal end of said fiber is substantially coplanar with said first, convex end of said ferrule.

22. The ferrule of claim 21, wherein said first, convex end is canted at an angle ranging from 0°–10° relative to said bore.

23. The connector of claim 21, wherein said optical fiber is fixed within said bore by an adhesive, said adhesive securing the optical fiber to the portions of said ceramic body which define said bore.

24. The connector of claim 21 wherein said terminal end of said fiber is substantially coplanar with said first, convex end of said ferrule.

25. An optical fiber connector, comprising:

a) a ferrule comprising a ceramic body of $CeO_2$—$ZrO_2$, said body comprising:

1) a first, convex end with a predetermined radius of curvature, 2) a second end, and 3) a bore through said body which joins said first and second ends;

b) a housing having a first end and a second end, said ferrule being contained within said housing such that said first end of said ferrule is extendible from said first end of said housing; and c) an optical fiber extending through said second end of said housing and through said second end of said ferrule, said optical fiber being fixedly positioned within said bore of said ferrule and having a terminal end proximate said first end of said ferrule.

26. The connector of claim 25, wherein:

said ferrule is slidably contained within said housing in a direction which is parallel to a line extending through said first and second ends of said housing; and said connector includes means for biasing said ferrule away from said second end of said housing such that said first end of said ferrule can be urged against an external surface.

27. A method of terminating an optical fiber in a ferrule, comprising the steps of:

a) providing a ferrule comprising a ceramic body of $CeO_2$—$ZrO_2$, said body comprising a first, convex end with a predetermined radius of curvature, a second end, and a bore which joins said first and second ends;

b) inserting an optical fiber through said second end of said ferrule and into said bore so that a terminal portion of said optical fiber protrudes from said first end of said ferrule;

c) cleaving said terminal portion such that a grindable or polishable part of said optical fiber remains extending from said first end of said ferrule; and d) grinding or polishing said grindable or polishable part of said optical fiber to form a terminal end which is substantially coplanar with said first end of said ferrule.

28. The method of claim 27, wherein said optical fiber is fixed within said bore by an adhesive, said adhesive securing said optical fiber to the portions of said ceramic body which define said bore.

29. The method of claim 27, wherein $CeO_2$ is present in said ceramic body at a weight percentage ranging from about 12–21 and $ZrO_2$ is present in said ceramic body at a weight percentage ranging from about 79–88.

* * * * *